United States Patent
Sarpatwari et al.

(10) Patent No.: US 9,575,727 B2
(45) Date of Patent: Feb. 21, 2017

(54) METHODS FOR GENERATING RANDOM DATA USING PHASE CHANGE MATERIALS AND RELATED DEVICES AND SYSTEMS

(71) Applicants: Karthik Sarpatwari, Meidian, ID (US); Hongmei Wang, Boise, ID (US); Sanjay Rangan, Boise, ID (US)

(72) Inventors: Karthik Sarpatwari, Meidian, ID (US); Hongmei Wang, Boise, ID (US); Sanjay Rangan, Boise, ID (US)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 14/497,777

(22) Filed: Sep. 26, 2014

(65) Prior Publication Data

US 2016/0092172 A1    Mar. 31, 2016

(51) Int. Cl.
```
G06F 7/58      (2006.01)
G09C 1/00      (2006.01)
G11C 13/00     (2006.01)
H04L 9/08      (2006.01)
H04L 9/32      (2006.01)
```

(52) U.S. Cl.
CPC ............ *G06F 7/58* (2013.01); *G06F 7/588* (2013.01); *G09C 1/00* (2013.01); *G11C 13/0004* (2013.01); *H04L 9/0866* (2013.01); *H04L 9/3278* (2013.01); *H04L 2209/12* (2013.01)

(58) Field of Classification Search
None
See application file for complete search history.

(56) References Cited

U.S. PATENT DOCUMENTS

| | | | |
|---|---|---|---|
| 2006/0157682 A1 | 7/2006 | Scheuerlein | |
| 2010/0182147 A1* | 7/2010 | Rueping | G06F 21/86 340/541 |
| 2014/0037086 A1 | 2/2014 | Seol et al. | |
| 2014/0136583 A1* | 5/2014 | Hyde | G06F 7/588 708/250 |
| 2014/0146607 A1 | 5/2014 | Nagai et al. | |
| 2015/0049547 A1* | 2/2015 | Kim | G11C 29/028 365/185.09 |
| 2016/0028544 A1* | 1/2016 | Hyde | H04L 9/0869 380/44 |
| 2016/0092172 A1* | 3/2016 | Sarpatwari | G06F 7/58 708/250 |

(Continued)

OTHER PUBLICATIONS

Zhang et al, "Exploiting Process Variations and Programming Sensitivity of Phase Change Memory for Reconfigurable Physical Unclonable Functions", IEEE Transactions on Information Forensics and Security, vol. 9, No. 6, Jun. 1, 2014, Piscataway, NJ, US.

*Primary Examiner* — David H Malzahn
(74) *Attorney, Agent, or Firm* — Thorpe North & Western, LLP

(57) ABSTRACT

Devices and systems operable to generate random numbers are disclosed and described. Such include an array of phase change material cells electrically coupled to circuitry configured to initially set all cells in the array to a high state, send a programming pulse through the array having a current sufficient to randomly set each cell to either the high state or a low state to generate a random distribution of cell states across the array, and to read the random distribution of cell states out of the array.

20 Claims, 3 Drawing Sheets

(56) References Cited

U.S. PATENT DOCUMENTS

2016/0099810 A1\* 4/2016 Li .................. H04L 9/0894
713/193
2016/0133322 A1\* 5/2016 Zamir ................ G11C 13/0033
708/250

\* cited by examiner

METHODS FOR GENERATING RANDOM DATA USING PHASE CHANGE MATERIALS AND RELATED DEVICES AND SYSTEMS

BACKGROUND

Phase change materials are materials that can be repeatedly altered into distinct physical states that can be utilized for a desired task. More specifically, phase change memory is a type of non-volatile random-access memory that utilizes a detectable change in the physical state of the phase change material as an information storage medium. For example, the change in phase of a material from an amorphous state to a crystalline state or vice versa, can be induced and then detected in order to store and then retrieve information. As a simplified example, a chalcogenide material can be heated and cooled in a manner that solidifies the material in an amorphous state, or the chalcogenide can be heated and cooled in a manner that solidifies the material in a crystalline state. Other specific heating and cooling protocols may be employed to result in solidification of the chalcogenide material at different specific degrees of crystallinity across the spectrum between completely amorphous and completely crystalline states.

Once solidified, the phase change material is non-volatile. The phase change material state, whether solidified to a crystalline, semi-crystalline, amorphous, or semi-amorphous state, is thus retained until reprogrammed. This is due to the fact that, once solidified, the state of the material is not dependent upon electrical input.

DESCRIPTION OF EMBODIMENTS

Figure 1:
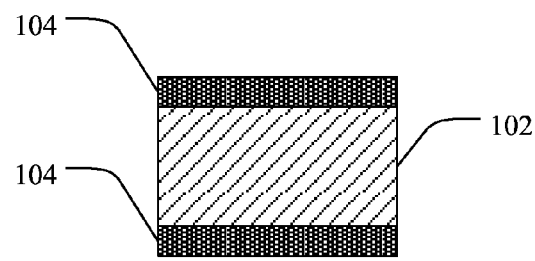
FIG. 1 is a schematic view of a phase change material random number generating (RNG) device in accordance with an invention embodiment.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "random" is intended to be used according to its plain and ordinary meaning in the art. As such, "random" can refer to various degrees of unpredictability regarding random data generation, including, without limitation, pseudorandom, random, apparent randomness, true randomness, and the like.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential technological features, nor is it intended to limit the scope of the claimed subject matter.

The generation of random numbers, or more specifically the generation of data, including a number or numbers, by a random number generator (RNG), has a wide variety of applications. Examples of such applications can include, without limitation, cryptography, statistical sampling, computer modeling, device/system authentication, gambling, randomized design, and the like, including other applications where an unpredictable result is beneficial or desirable. As the need for large numbers having some degree of randomness has increased, RNGs have generally moved from traditional mechanical RNG devices to computational algorithms that generate random or pseudorandom numbers or number sequences. Computer algorithms, by their very nature, are generally pseudorandom processes that can inherently contain some level of discernable pattern in the generated number sequences. As such, many applications, particularly those in the security and cryptography arts, prefer RNG processes that achieve or approximate true randomness. The desired degree of unpredictability in the output pattern of an RNG device can thus be a factor of the importance placed on the application to which the random data is to be used by a user or designer.

Various devices, systems, and methods are presently provided utilizing a hardware implementation for generating random data sequences, such as, for example, a number or numbers having generally unpredictable sequences. The present scope includes any level of randomness, ranging from pseudorandomness to apparent randomness to true randomness, as well as data generation that has been purposefully biased to generate within a desired range or to approximate a desired result. Thus, the concept of "randomness" is relative, and is to be evaluated in a given situation based on the particular application involved, the intended results, and/or the desired or expected level of unpredictability in the data. In one example, randomness can specifically refer to true randomness.

In one example, a phase change material can be utilized to generate data of a random nature. Such materials are capable of being repeatedly altered into detectably distinct and stable structural states, and can thus be used in numerous applications where such phase change properties can be beneficially utilized. Generally such phase change materials are purposefully set into a given state to be used as switching, memory storage, addressing, or other similar application. Chalcogenide (sometimes referred to as chalcogide) materials, for example, can be repeatedly altered from an amorphous to a crystalline state based on the manner in which the material is heated and/or cooled to the solidified state. Thus, an electrical current can be used to fix the chalcogenide material into an amorphous or a crystalline state depending on various current characteristics that affect heating and/or cooling. For example, higher level currents are generally used to set the chalcogenide material to a high or amorphous state, while lower level currents are generally used to set the chalcogenide material to a low or crystalline state. Either of these nonvolatile states of the material are thus maintained until a subsequent electrical current alters the structure of the chalcogenide. Additionally, in some cases chalcogenide materials can also be solidified into multiple states along the range from amorphous to crystalline, and thus are not necessarily limited to binary applications.

A general description of a non-limiting design of a device utilizing a phase change material is shown in FIG. 1, including a phase change material 102 disposed between at least two electrodes 104 that can deliver the current to alter the structural state of the material, as well as to provide electrical access for device functionality. Such electrical access can be for a variety of purposes such as, for example, querying the state of a system, querying the state of a cell of phase change material, reading out the value of a given cell of phase change material, and the like.

In one example, a phase change material such as a chalcogenide material can be utilized as a RNG by first applying a programming or reset signal to the device having a current that is sufficient to set the chalcogenide material to a high state, or in other words, to the amorphous state or a state that is detectable as the amorphous state. A subsequent programming or RNG current is then applied to the chalcogenide material set to the high state, where the RNG current has a value that is less than the high current, but greater than the low current generally used to set the material to the low state. The RNG current thus causes the chalcogenide material to melt and re-solidify into either the high state or the low state, where the probability of a given state is effectively random. Thus, by setting one or more cells of a chalcogenide material to a high state and subsequently applying such an RNG current to the material, an effective hardware-based RNG can be achieved.

Figure 2:
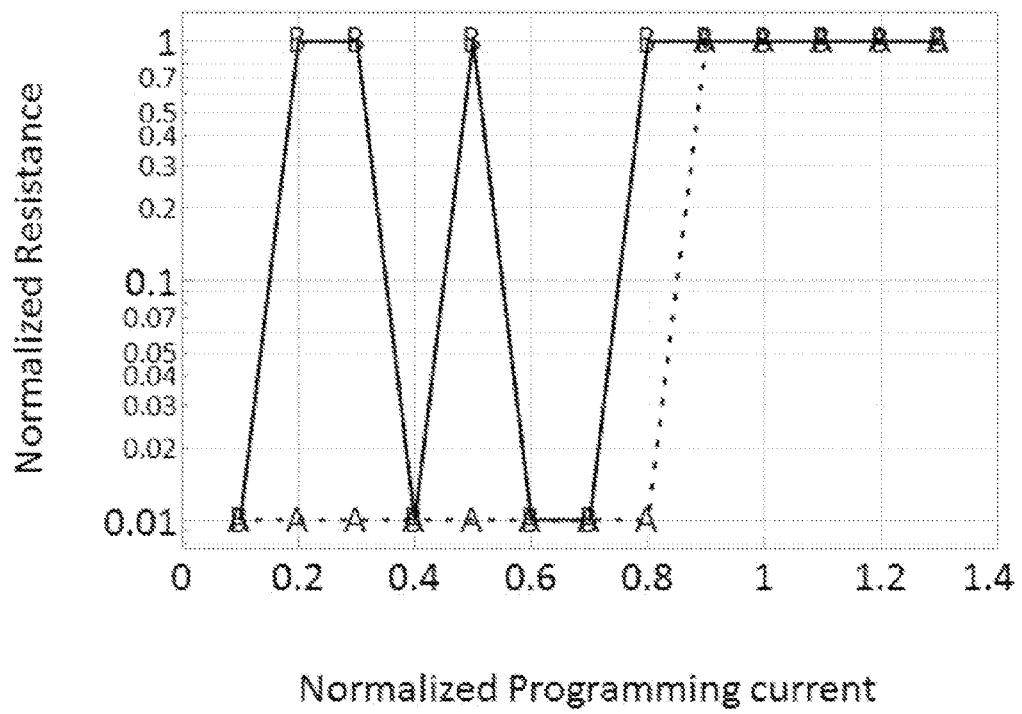
FIG. 2 is a graphical representation of data in accordance with an invention embodiment.

The current used to generate the random state fluctuation in the chalcogenide material can be any current, both in terms of the electrical properties and/or the temporal characteristics of the current, which can cause the material to randomly achieve different states. While various descriptions of such currents are provided in both specific range and normalized depictions, these should not be seen as limiting. As one example, FIG. 2 shows a normalized representation of data where the dotted line ('A') represents chalcogenide material initially solidified to the low state where an intermediate or RNG current is applied at increasing current values. In this case, the state of the chalcogenide re-solidifies to the low state until the current is increased to a point whereby the material solidifies to the high state. No random fluctuations are seen for this particular data set, which can be seen in the normalized resistance along the y-axis of the graph. The low state is crystalline, and therefore has a low resistance, while the high state is amorphous, and thus has a high resistance. The solid line ('B'), however, which represents chalcogenide material initially solidified to the high state, shows random fluctuations in the material between the high state and the low state as the current is increased. These random fluctuations are represented graphically as the solid line moves back and forth between the top and bottom of the graph due to the resistance changes in the material at different states.

As has been described, specific values for current applied to achieve the RNG effect can vary depending on the device design, the specific materials used, as well as the voltage values use to drive the current. As such, those skilled in the art can readily design and implement useful RNG currents to achieve such random results for a given device or system design once in possession of the present disclosure. In one example, however, an RNG or programming current can have a current value of from about 100 nA to about 10 mA at a voltage of from about 1V to about 15V. In another example, the programming current can have a current of from about 300 nA to about 5 mA at a voltage of from about 1V to about 15V. In another example, the programming current can have a current of from about 500 nA to about 1 mA at a voltage of from about 1V to about 15V. In another example, the programming current can have a current of from about 700 nA to about 800 µA at a voltage of from about 1V to about 15V. In another example, the programming current can have a current of from about 1 µA to about 500 µA at a voltage of from about 1V to about 15V. In another example, the programming current can have a current of from about 15 µA to about 100 µA at a voltage of from about 1V to about 15V. In another example, the programming current can have a current of from about 100 nA to about 800 µA at a voltage of from about 1V to about 15V. In another example, the programming current can have a current of from about 1 µA to about 10 mA at a voltage of from about 1V to about 15V.

It can also be useful to design RNG devices and systems having various structures and configurations that allow arrays of phase change materials to be utilized in conjunction to generate random data in the form of, for example, large random numbers. In some cases, a random number can be as large as the array in which it is generated. As such, in one example an array of phase change materials or material cells can be utilized to generate a single random number per reset/RNG processing event. In this case, the phase change material cells are set to a high state, the RNG current is applied, and a single random number is thus generated. In another example, one reset/RNG processing event can generate multiple random numbers from the array. In this case, the phase change memory cells are set to high, the RNG current is applied, and multiple random numbers are generated by the array. It is noted that, in many cases, the distinction between one or more numbers generated in a single reset/RNG processing event can be dependent on how the data is read out of the array, and/or how the data is subsequently processed. However, in some examples it is contemplated that segmentation points can be introduced into the RNG process, or even into the hardware design, that segments the data into multiple numbers at the point of generation.

Figure 3:
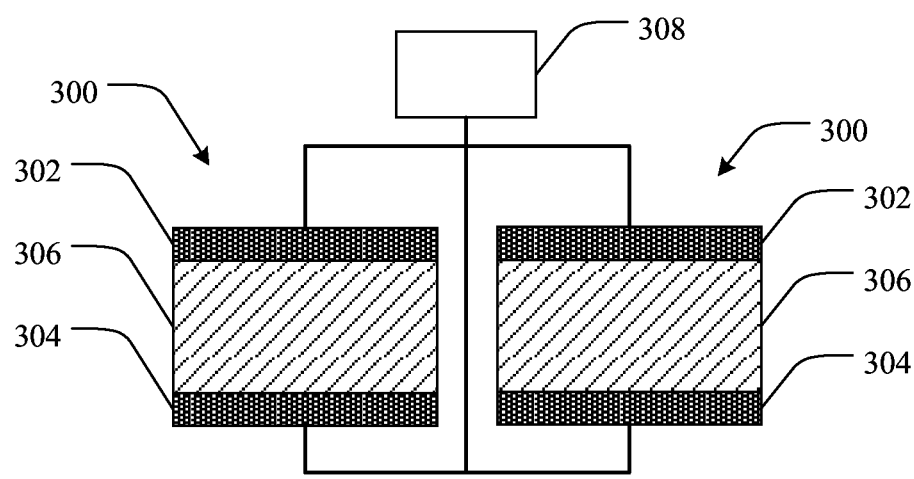
FIG. 3 is a schematic view of a phase change material RNG device in accordance with an invention embodiment.

One example of a RNG device, as shown in FIG. 3, can include a plurality of phase change cells 300, such as phase change memory cells, arranged in at least a row to form an addressable array. While FIG. 3 shows two cells for simplicity, it is understood that any number of cells is included in the present scope. Each cell 300 can include a first electrode 302, a second electrode 304, and a phase change material 306 positioned between and electrically coupled to the first electrode 302 and the second electrode 304. The phase change material 306 is thus capable of changing phase between a high state and a low state in response to an electrical current. A read/write controller 308 is electrically coupled to the array and specifically configured to program all cells 300 in the array to a high state, and to subsequently to introduce a programming or RNG current into the array sufficient to randomly set each cell 300 to the high state or the low state to generate a random distribution of cell states across the array. Regarding the actual state of the phase change material, in one example the high state is an amorphous or substantially amorphous state and the low state is a crystalline or substantially crystalline state. In another example, the high state has a higher degree of amorphosity as compared to the low state. It is additionally contemplated that other states of a material can be utilized, depending on the physical characteristics of the material.

The read/write controller can additionally be operable to, in addition to setting the state of the phase change material and generating the RNG current, read the random distribution of cell states out of the array, as well as any addressing, querying, or other useful function. In some aspects, the read/write controller can be specifically designed to reset the array to a high state and subsequently introduce a RNG pulse into the array. In other aspects, a standard read/write memory controller for phase change memory can be utilized, provided that the controller is modified to function as described. Thus, regardless of the design, the read/write controller can include circuitry configured to specifically generate a programming pulse or a range of programming pulses that is not considered in previous read/write controller designs due to the potential for memory errors when utilizing currents that do not set the state of the phase change material unambiguously to a high or to a low state.

In another example of a RNG device design such as that described in conjunction with FIG. 3, the plurality of memory cells can be arranged in rows and columns to form a two dimensional array. In yet another example, multiple two dimensional arrays can be included in a stacked configuration. Such two dimensional and three dimensional arrays can greatly increase the size of random numbers generated. As such, it is understood that the size of a RNG device or system can vary depending on the desired use of the device or system. In some examples, a device or system can include one, two, or more cells. In other examples, array size can be measured based on storage capacity, as would be the case for phase change memory cells. It is thus contemplated that such a device can include a memory size for generating such random data on the order of kilobytes, megabytes, gigabytes, tens of gigabytes, hundreds of gigabytes, or thousands of gigabytes or more. The device for a given memory size can include a single array or multiple arrays, positioned in a planar arrangement, a stacked arrangement, in a planar and a stacked arrangement, or in any other arrangement contemplated.

Figure 4:
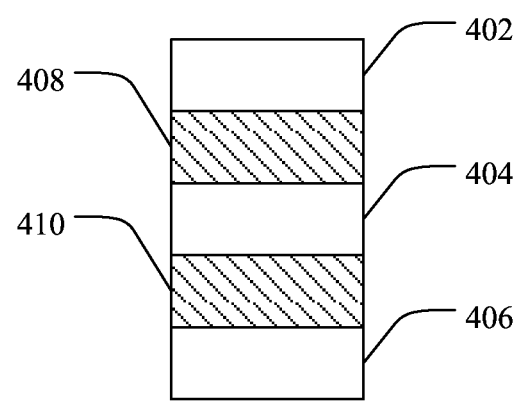
FIG. 4 is a schematic view of a phase change material RNG device in accordance with an invention embodiment.

In yet another example, a RNG device can incorporate phase change memory cells in an array, and can thus utilize various structures, designs, and implementations used in traditional phase change memory arrays, including programming, addressing, I/O processing, and the like. FIG. 4 shows one non-limiting example of a memory cell design that can be utilized in such an array. Such a memory cell can include a stacked structure having at least three electrodes, a first electrode 402, a second electrode 404, and a third electrode 406. A phase change material 408 is disposed between the first electrode 402 and the second electrode 404, and a select device material 410 is disposed between the third electrode 406 and the second electrode 404. In one example the select device material 410 can be used to address a cell or group of cells, and the phase change material 408 can be used to generate the random state for the RNG process. It is additionally contemplated that in some examples this arrangement can be switched.

As a general matter, the phase change material can include any useful material having a stable and detectable change in phase. Examples of such a materials include any of a variety of chalcogenide alloys, including, without limitation, Ge—Te, In—Se, Sb—Te, Ge—Sb, Ga—Sb, In—Sb, As—Te, Al—Te, Ge—Sb—Te, Te—Ge—As, In—Sb—Te, In—Se—Te, Te—Sn—Se, Ge—Se—Ga, Bi—Se—Sb, Ga—Se—Te, Sn—Sb—Te, In—Sb—Ge, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Sb—Se—Te, Ge—Sn—Sb—Te, Ge—Te—Sn—Ni, Ge—Te—Sn—Pd, and Ge—Te—Sn—Pt, among others. The hyphenated chemical composition notation, as used herein, indicates the elements included in a particular mixture or compound, e.g., chalcogenide alloy, and is intended to represent all stoichiometries involving the indicated elements, e.g., $Ge_xSb_yTe_z$ having variations in stoichiometries, such as $Ge_2Sb_2Te_5$, $Ge_2Sb_2Te_7$, $Ge_1Sb_2Te_4$, $Ge_1Sb_4Te_7$, etc., to form a gradient.

It is noted that the select device material is generally made of a phase change material, and as such, the above exemplary chalcogenide materials are applicable as well. The actual chalcogenide material used in a given memory cell for the phase change material layer and the select device material layer can be different or the same, depending on the design of the device.

In another example, a phase change material device is provided that is operable to generate random numbers. Such a device can include an array of phase change material cells electrically coupled to circuitry that is configured or operable to initially set all cells in the array to a high state, send a programming pulse through the array having a current sufficient to randomly set each cell to either the high state or a low state to generate a random distribution of cell states across the array, and to read the random distribution of cell states out of the array. Additionally, in some examples the circuitry can be configured to correlate the random distribution of cell states with one or more random numbers. It is additionally contemplated that correlation of the random distribution of cell states can occur in a separate processer element. In other examples, the circuitry can be configured to a bias into the random distribution of cell states. This can be accomplished by altering the RNG current used to generate the distribution of cell states, or by introducing a bias into the data set during or following readout of the array. A bias can additionally be introduced by a separate and distinct current passed through the array or a portion of the array prior to or following the delivery of the RNG current into the array.

It is additionally contemplated that the random distribution of cell states can be read out from the array in any conceivable order, from an orderly readout to a random readout. In one example, reading the random distribution of cell states out of the array is according to a row-wise process. In another example, reading the random distribution of cell states out of the array is according to a column-wise process. In yet another example, reading the random distribution of cell states out of the array is according to an unordered process, or in some cases a random order process. As such, the random distribution of cell states can be further affected by the readout process.

Figure 5:
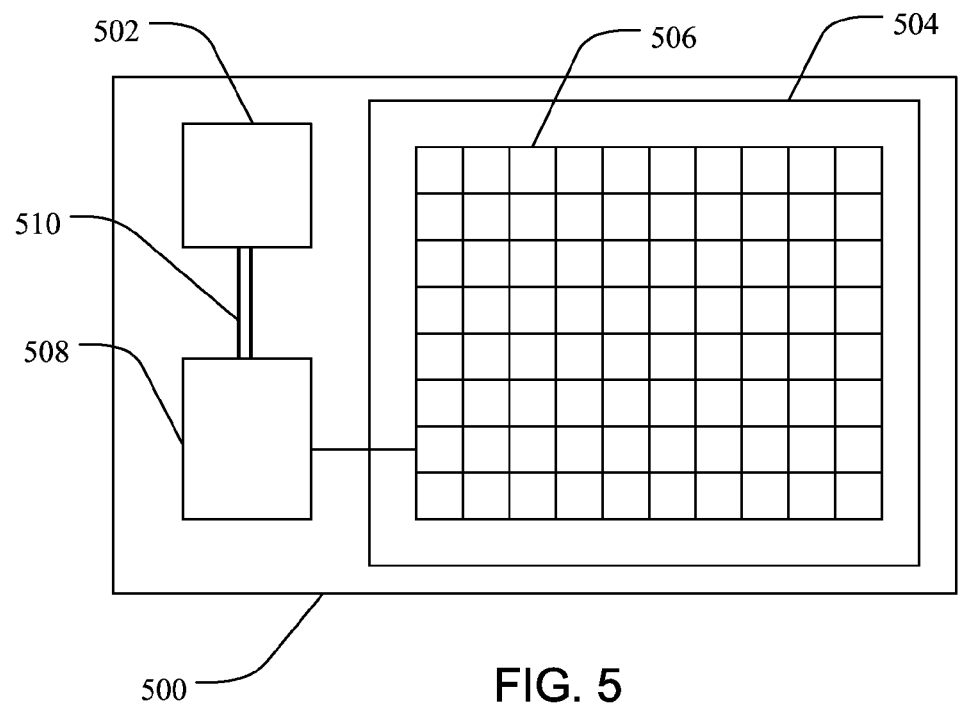
FIG. 5 is a schematic view of a phase change material RNG system in accordance with an invention embodiment.

Additionally, a variety of devices and systems incorporating RNG processes using phase change materials are contemplated. Any system or device utilizing such a random phase change process is considered to be within the present scope. In one non-limiting example, a device authentication system is provided, as is shown in FIG. 5. Such a system 500 can include a device authentication module 502, and a RNG module 504. The RNG module 504 can include a plurality of phase change material cells arranged in at least a row to form an addressable array 506, where each cell includes a first electrode, a second electrode, and a phase change material positioned between and electrically coupled to the first electrode and the second electrode (not shown). The phase change material cell is capable of changing phase between a high state and a low state in response to an electrical current. A read/write controller 508 is electrically coupled to the array 506 and specifically configured to program all cells in the array 506 to a high state, to subsequently introduce a programming current into the array 506 sufficient to randomly set each cell to the high state or the low state to generate a random distribution of cell states across the array 506, and to read the random distribution of cell states out of the array 506. Furthermore, an input/output bus 510 is electrically coupled to the read/write controller 508, and is structurally configured to transfer the random distribution of cell states to the authentication module 502.

Figure 6:
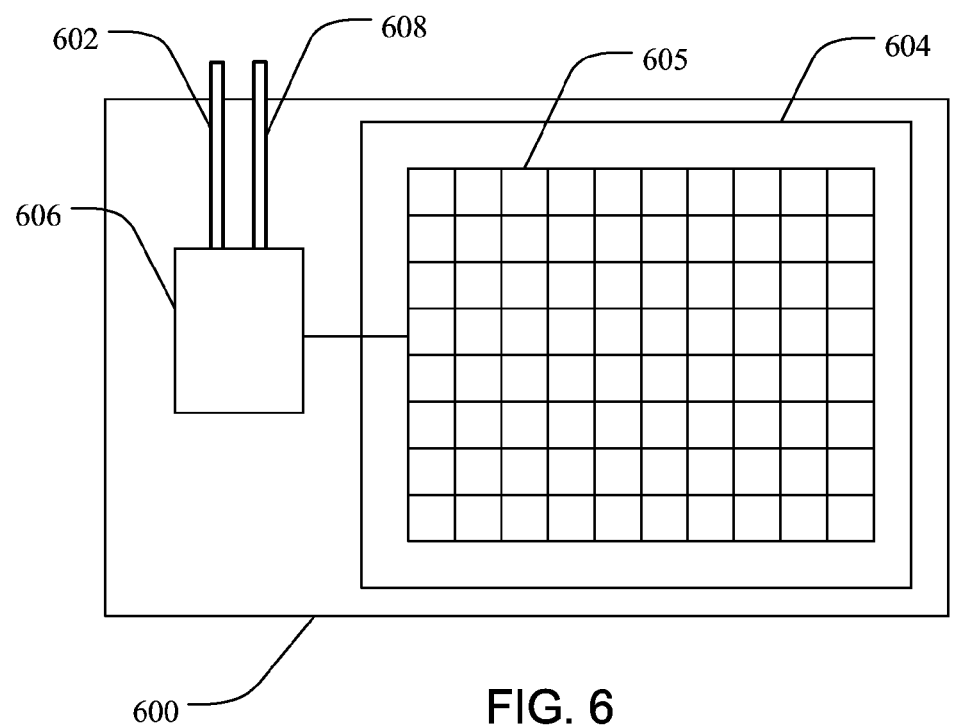
FIG. 6 is a schematic view of a phase change material RNG system in accordance with an invention embodiment.

In another example, a system 600 for generating random numbers is provided, as is shown in FIG. 6. Such a system can include an input bus 602 configured to transmit into the system a query for a random number, a RNG module 604 including a plurality of phase change material cells arranged in at least a row to form an addressable array 605, each cell including a first electrode, a second electrode, and a phase change material positioned between and electrically coupled to the first electrode and the second electrode (not shown). The phase change material cell is capable of changing phase between a high state and a low state in response to an electrical current. Additionally, a read/write controller 606 is electrically coupled to the array of the RNG module 604. The read/write controller 606 is specifically configured to receive the query for the random number from the input bus 602, to program all cells in the array to a high state, to subsequently introduce a programming current into the array sufficient to randomly set each cell to the high state or the low state to generate a random distribution of cell states across the array, and to read the random distribution of cell states out of the array. The system can further include an output bus 608 electrically coupled to the read/write controller 606 and structurally configured to transmit the random distribution of cell states from the read/write controller 606.

In one example, a method of generating a random number using an array of a plurality of discrete phase change material cells is provided. Such a method can include sending a high reset pulse through the array to program each of the plurality of cells in the array to a high state, sending a programming pulse through the array having a current sufficient to randomly set each cell into the high state or a low state to form a random distribution of cell states across the array, and reading the random distribution of cell states out of the array. In another example, the method can include correlating the random distribution of cell states with a random number.

In one exemplary invention embodiment, a random number generator device is provided. Such a device can include a plurality of cells arranged in at least a row to form an addressable array, where each cell includes a first electrode, a second electrode, and a phase change material electrically coupled between the first electrode and the second electrode, where the phase change material is capable of changing phase between a high state and a low state in response to an electrical current. The example embodiment further includes a read/write controller electrically coupled to the array and specifically configured to program all cells in the array to a high state and subsequently to introduce a programming current into the array sufficient to randomly set each cell to the high state or the low state to generate a random distribution of cell states across the array.

In one example, the plurality of cells is arranged in rows and columns to form a two dimensional array.

In one example, the device can include multiple two dimensional arrays in a stacked configuration.

In one example, the programming current has a current of from about 100 nA to about 10 mA at a voltage of from about 1 to about 15V.

In one example, the programming current has a current of from about 300 nA to about 5 mA at a voltage of from about 1 to about 15V.

In one example, the high state is an amorphous or substantially amorphous state and the low state is a crystalline or substantially crystalline state.

In one example, the high state has a higher degree of amorphosity as compared to the low state.

In an exemplary invention embodiment, a phase change material device operable to generate random numbers is provided comprising an array of phase change material cells electrically coupled to circuitry configured to initially set all cells in the array to a high state, send a programming pulse through the array having a current sufficient to randomly set each cell to either the high state or a low state to generate a random distribution of cell states across the array, and read the random distribution of cell states out of the array.

In one example, the device is further configured to correlate the random distribution of cell states with a random number.

In one example, the device is further configured to introduce a bias into the random distribution of cell states.

In one example, reading the random distribution of cell states out of the array is according to a row-wise process.

In one example, reading the random distribution of cell states out of the array is according to a column-wise process.

In one example, reading the random distribution of cell states out of the array is according to an unordered process.

In an exemplary invention embodiment, a device authentication system is provided. Such a system can include a device authentication module and a random number-generating module including a plurality of phase change material cells arranged in at least a row to form an addressable array. Each cell includes a first electrode, a second electrode, and a phase change material electrically coupled between the first electrode and the second electrode, where the phase change material cell is capable of changing phase between a high state and a low state in response to an electrical current. The random number-generating module further includes a read/write memory controller electrically coupled to the array and specifically configured to program all cells in the array to a high state, to subsequently introduce a programming current into the array sufficient to randomly set each cell to the high state or the low state to generate a random distribution of cell states across the array, and to read the random distribution of cell states out of the array. The device authentication system further includes an input/output bus electrically coupled to the read/write memory controller and structurally configured to transfer the random distribution of cell states to the authentication module.

In one example, the plurality of cells is arranged in rows and columns to form a two dimensional array.

In one example, the random number-generating module further includes multiple two dimensional arrays in a stacked configuration.

In an exemplary invention embodiment, a system for generating random numbers is provided. Such a system can include an input bus configured to transmit a query for a random number into the system, and a random number-generating module including a plurality of phase change material cells arranged in at least a row to form an addressable array. Each memory cell includes a first electrode, a second electrode, and a phase change material positioned between and electrically coupled to the first electrode and the second electrode, the phase change material cell being capable of changing phase between a high state and a low state in response to an electrical current. The system further includes a read/write memory controller electrically coupled to the array and specifically configured to receive the query for the random number from the input bus, to program all cells in the array to a high state, to subsequently introduce a programming current into the array sufficient to randomly set each cell to the high state or the low state to generate a random distribution of cell states across the array, and to read the random distribution of cell states out of the array. The system also includes an output bus electrically coupled to the read/write memory controller and structurally configured to transmit the random distribution of cell states from the read/write memory controller.

In one example, the plurality of cells is arranged in rows and columns to form a two dimensional array.

In one example, the random number-generating module includes multiple two dimensional arrays in a stacked configuration.

In an exemplary invention embodiment, a method of generating a random number using an array of a plurality of discrete phase change material cells is provided. Such a method can include sending a high reset pulse through the array to program each of the plurality of cells in the array to a high state, sending a programming pulse through the array having a current sufficient to randomly set each cell into the high state or a low state to form a random distribution of cell states across the array, and reading the random distribution of cell states out of the array.

In one example, the method further includes correlating the random distribution of cell states with a random number.

In one example, the programming pulse has a current of from about 100 nA to about 10 mA at a voltage of from about 1 to about 15V.

In one example, the programming pulse has a current of from about 300 nA to about 5 mA at a voltage of from about 1 to about 15V.

In one example, reading the random distribution of cell states out of the array is according to a row-wise process.

In one example, reading the random distribution of cell states out of the array is according to a column-wise process.

In one example, reading the random distribution of cell states out of the array is according to an unordered process.

In one example, the method further includes introducing an electrical bias to the programming pulse to introduce a bias into the random distribution of cell states.

While the forgoing examples are illustrative of the specific embodiments in one or more particular applications, it will be apparent to those of ordinary skill in the art that numerous modifications in form, usage and details of implementation can be made without departing from the principles and concepts articulated herein.

What is claimed is:

1. A random number generator device, comprising:
 a plurality of cells arranged in at least a row to form an addressable array, each cell including:
  a first electrode;
  a second electrode;
  a phase change material electrically coupled between the first electrode and the second electrode, the phase change material being capable of changing phase between a high state and a low state in response to an electrical current; and
 a read/write controller electrically coupled to the array and configured to program all cells in the array to a high state and subsequently to introduce a programming current into the array sufficient to randomly set each cell to the high state or the low state to generate a random distribution of cell states across the array.

2. The device of claim 1, wherein the plurality of cells is arranged in rows and columns to form a two dimensional array.

3. The device of claim 2, further comprising additional two dimensional arrays in a stacked configuration.

4. The device of claim 1, wherein the programming current has a current of from about 100 nA to about 10 mA at a voltage of from about 1 to about 15V.

5. The device of claim 1, wherein the high state is an amorphous or substantially amorphous state and the low state is a crystalline or substantially crystalline state.

6. The device of claim 1, wherein the high state has a higher degree of amorphosity as compared to the low state.

7. A phase change material device operable to generate random numbers comprising an array of phase change material cells electrically coupled to circuitry configured to:
 initially set all cells in the array to a high state;
 send a programming pulse through the array having a current sufficient to randomly set each cell to either the high state or a low state to generate a random distribution of cell states across the array; and
 read the random distribution of cell states out of the array.

8. The device of claim 7, wherein the circuitry is further configured to correlate the random distribution of cell states with a random number.

9. The device of claim 7, wherein the circuitry is further configured to introduce a bias into the random distribution of cell states.

10. The device of claim 7, wherein reading the random distribution of cell states out of the array is according to a row-wise process.

11. The device of claim 7, wherein reading the random distribution of cell states out of the array is according to a column-wise process.

12. A system for generating random numbers, comprising:
 an input bus configured to transmit a query for a random number into the system;
 a random number-generating module including;
  a plurality of phase change material cells arranged in at least a row to form an addressable array, each memory cell including;
  a first electrode;
  a second electrode; and
  a phase change material electrically coupled between the first electrode and the second electrode, the phase change material cell being capable of changing phase between a high state and a low state in response to an electrical current;
 a read/write memory controller electrically coupled to the array and specifically configured to receive the query for the random number from the input bus, to program all cells in the array to a high state, to subsequently introduce a programming current into the array sufficient to randomly set each cell to the high state or the low state to generate a random distribution of cell states across the array, and to read the random distribution of cell states out of the array; and
 an output bus electrically coupled to the read/write memory controller and structurally configured to transmit the random distribution of cell states from the read/write memory controller.

13. The system of claim 12, wherein the plurality of cells is arranged in rows and columns to form a two dimensional array.

14. The system of claim 13, further comprising additional two dimensional arrays in a stacked configuration.

15. A method of generating a random number using an array of a plurality of discrete phase change material cells, comprising:
- sending a high reset pulse through the array to program each of the plurality of cells in the array to a high state;
- sending a programing pulse through the array having a current sufficient to randomly set each cell into the high state or a low state to form a random distribution of cell states across the array; and
- reading the random distribution of cell states out of the array.

16. The method of claim 15, further comprising correlating the random distribution of cell states with a random number.

17. The method of claim 15, wherein the programming pulse has a current of from about 100 nA to about 10 mA at a voltage of from about 1 to about 15V.

18. The method of claim 15, wherein reading the random distribution of cell states out of the array is according to a row-wise process.

19. The method of claim 15, wherein reading the random distribution of cell states out of the array is according to a column-wise process.

20. The method of claim 15, further comprising introducing an electrical bias to the programming pulse to introduce a bias into the random distribution of cell states.

* * * * *